(No Model.) 7 Sheets—Sheet 4.

W. A. THACHER.
DUMPING CAR.

No. 577,565. Patented Feb. 23, 1897.

WITNESSES:
Gustave Dieterich
Ed. D. Miller

INVENTOR
Wm. A. Thacher,
BY
Chas. C. Gill
ATTORNEY.

THE NORRIS PETERS CO., PHOTO-LITHO., WASHINGTON, D. C.

(No Model.) 7 Sheets—Sheet 5.
W. A. THACHER.
DUMPING CAR.
No. 577,565. Patented Feb. 23, 1897.
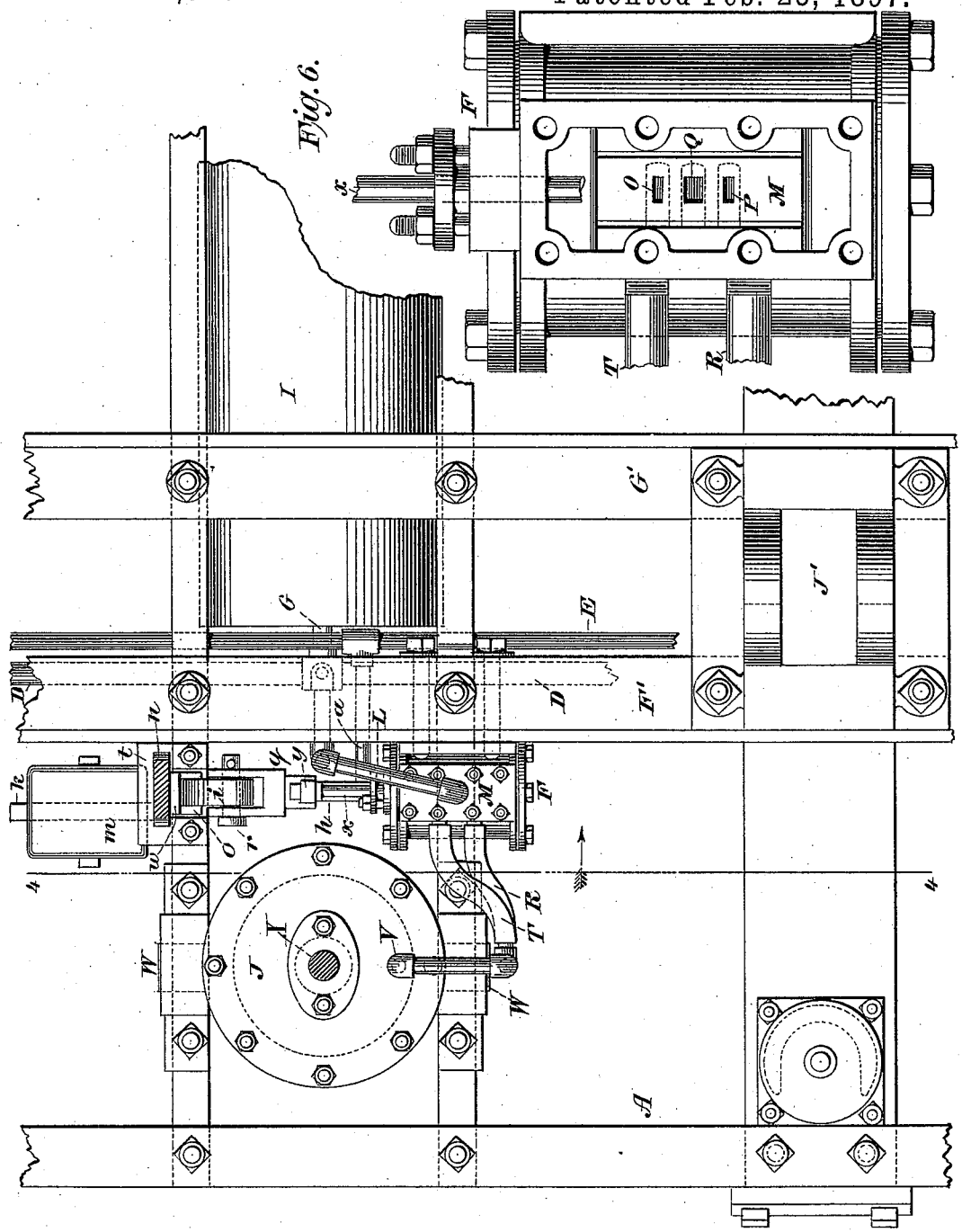
WITNESSES:
Gustave Dieterich
Ed. D. Miller
INVENTOR
William A. Thacher,
BY Chas. C. Gill
ATTORNEY.

(No Model.) 7 Sheets—Sheet 6.
W. A. THACHER.
DUMPING CAR.
No. 577,565. Patented Feb. 23, 1897.
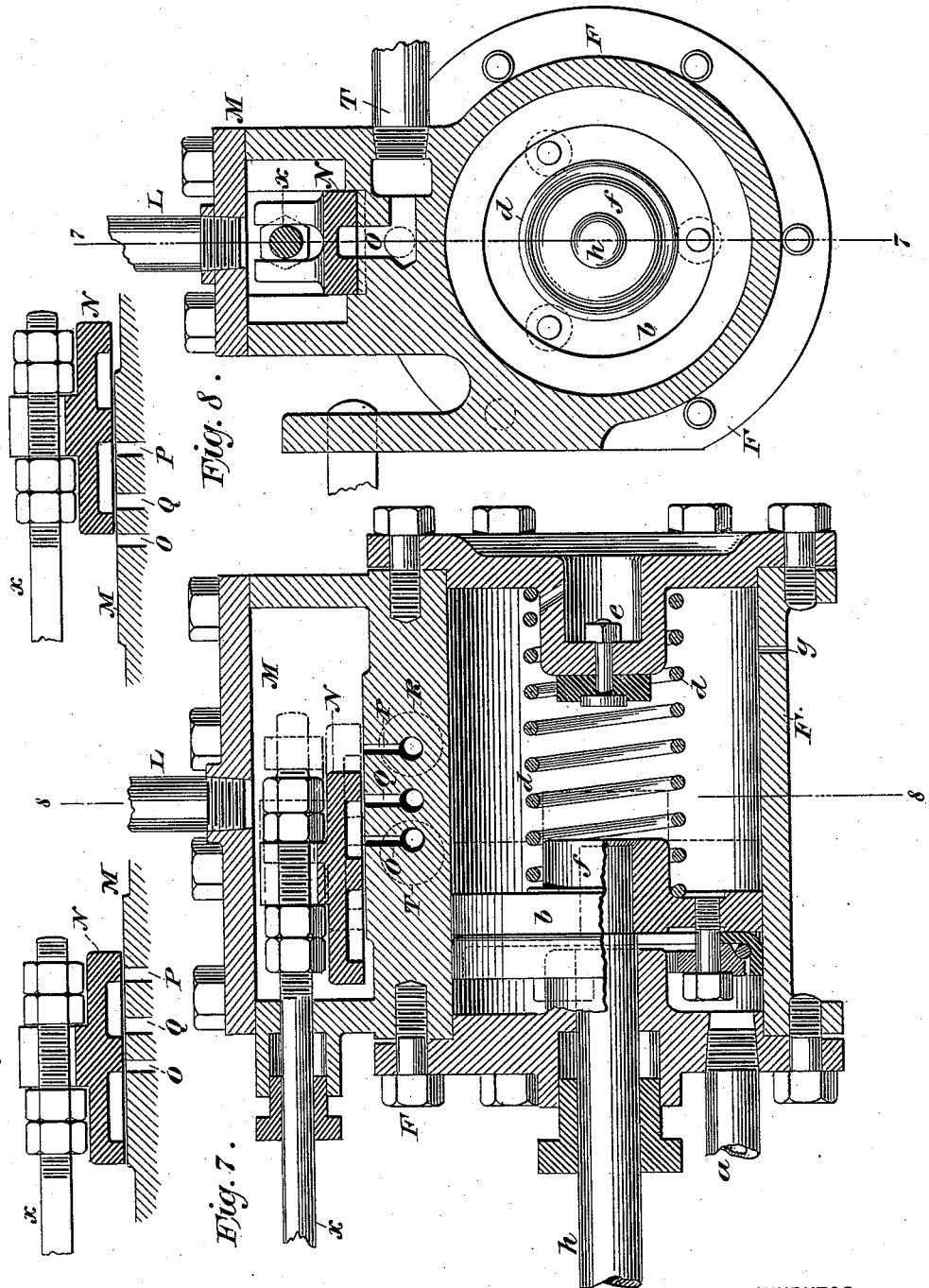
WITNESSES:
Gustave Dieterich
Ed. D. Miller
INVENTOR
William A. Thacher,
BY Chas. C. Gill
ATTORNEY.

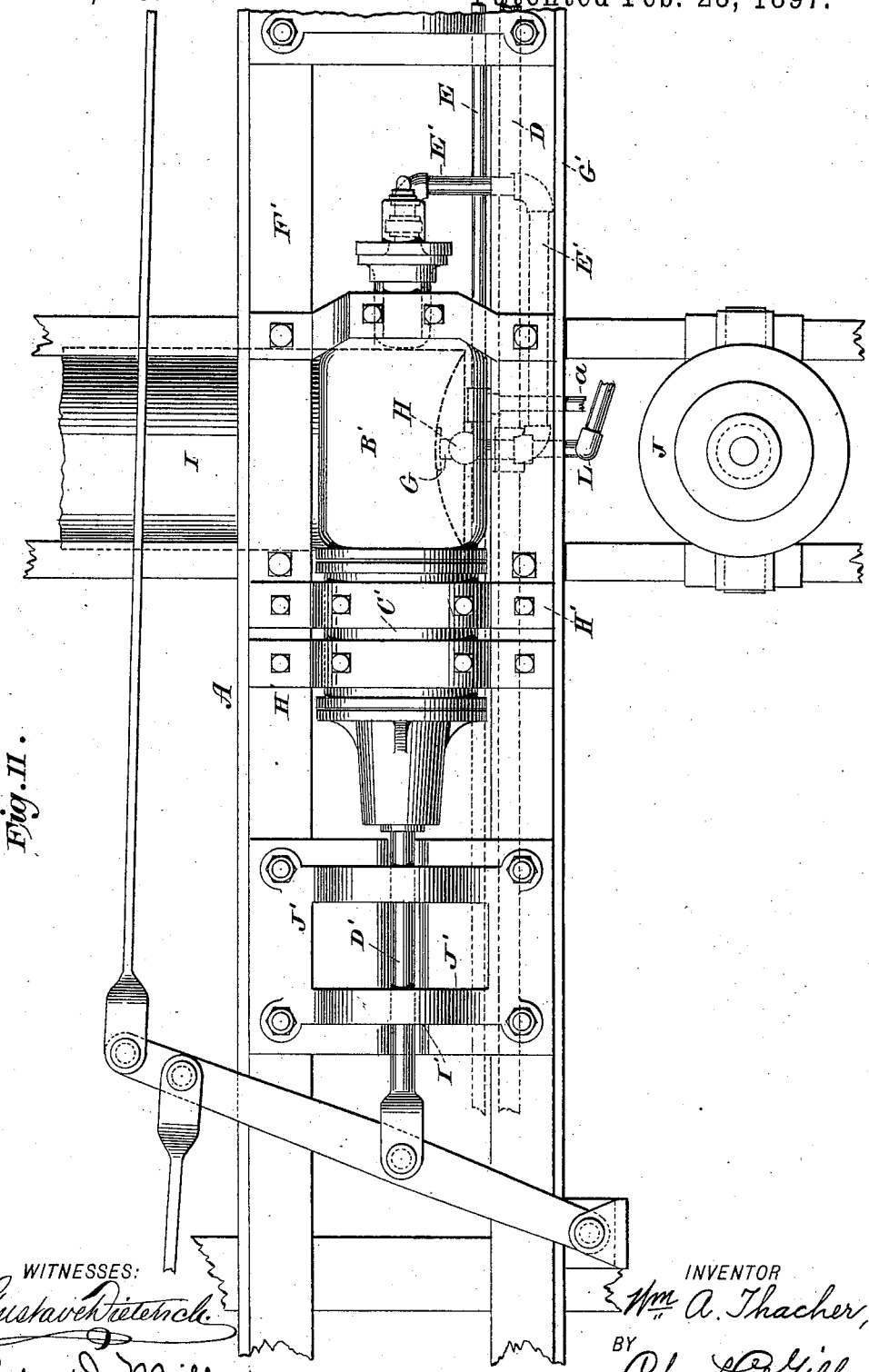

UNITED STATES PATENT OFFICE.

WILLIAM A. THACHER, OF NEW YORK, N. Y.

DUMPING-CAR.

SPECIFICATION forming part of Letters Patent No. 577,565, dated February 23, 1897.

Application filed November 27, 1893. Serial No. 492,054. (No model.)

*To all whom it may concern:*

Be it known that I, WILLIAM A. THACHER, a citizen of the United States, and a resident of New York, in the county of New York and State of New York, have invented certain new and useful Improvements in Dumping-Cars, of which the following is a specification.

The invention belongs to the class of dumping-cars in which the car-body or receptacle is capable of being tilted to dump its contents and returned to position by compressed-air mechanism under the control of the engineer in his cab; and examples of this class of dumping-cars may be found in Letters Patent of the United States heretofore granted to me and numbered and dated as follows: No. 489,242, of January 3, 1893; No. 489,243, of January 3, 1893, and No. 496,672, of May 2, 1893.

My invention consists in the novel features hereinafter described, and particularly pointed out in the claims.

Figure 1:
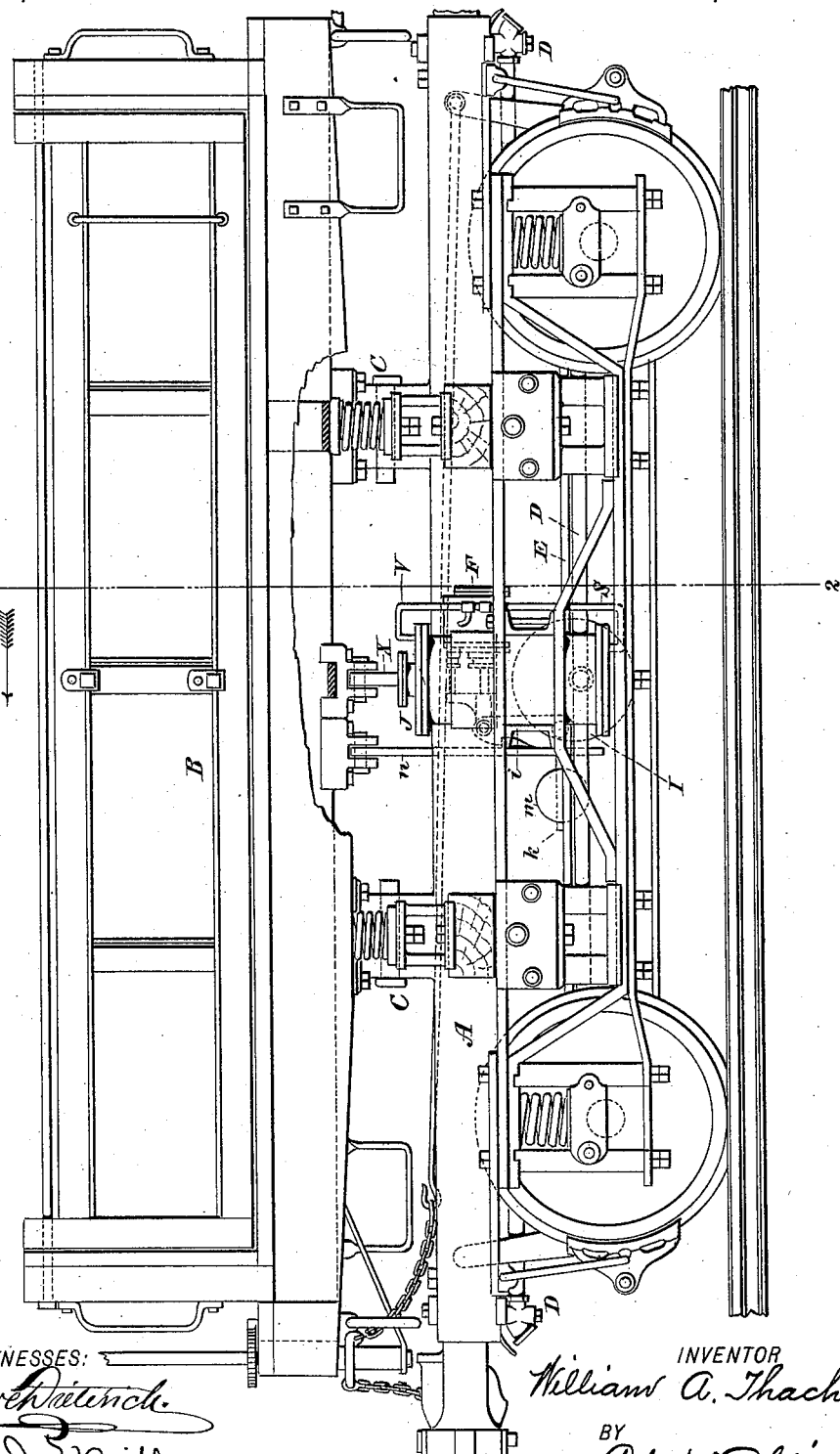
Figure 2:
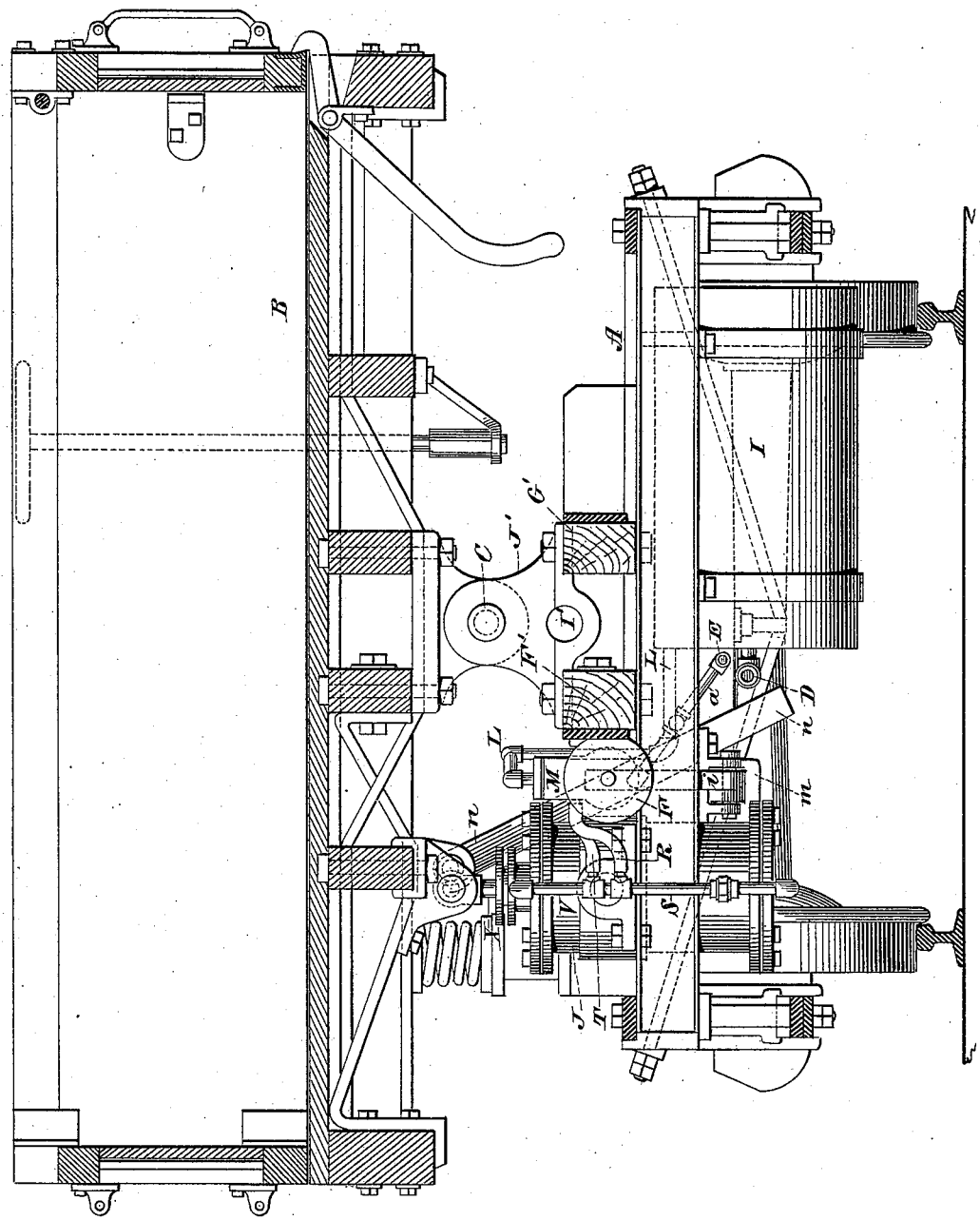
Figure 3:
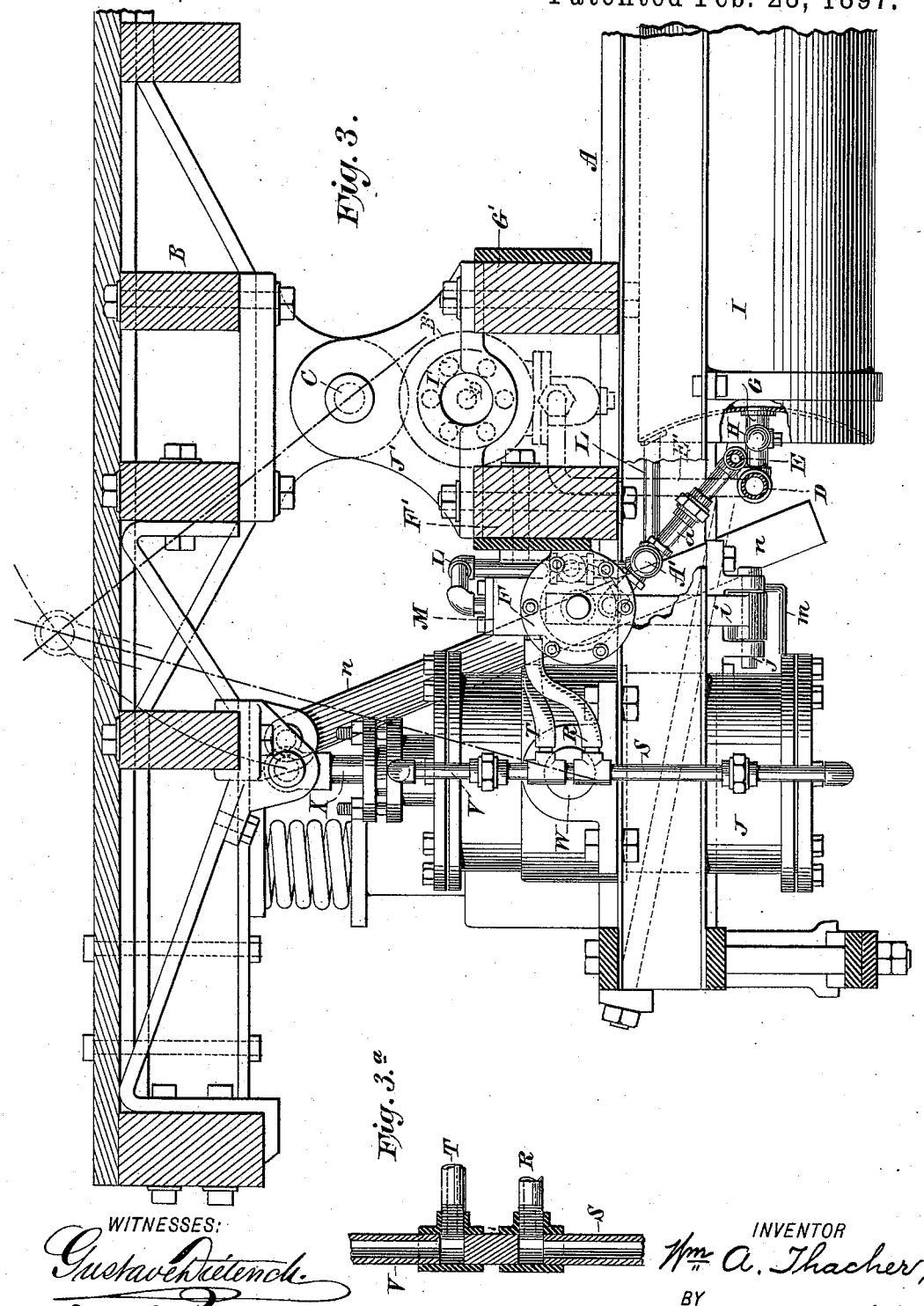
Figure 4:
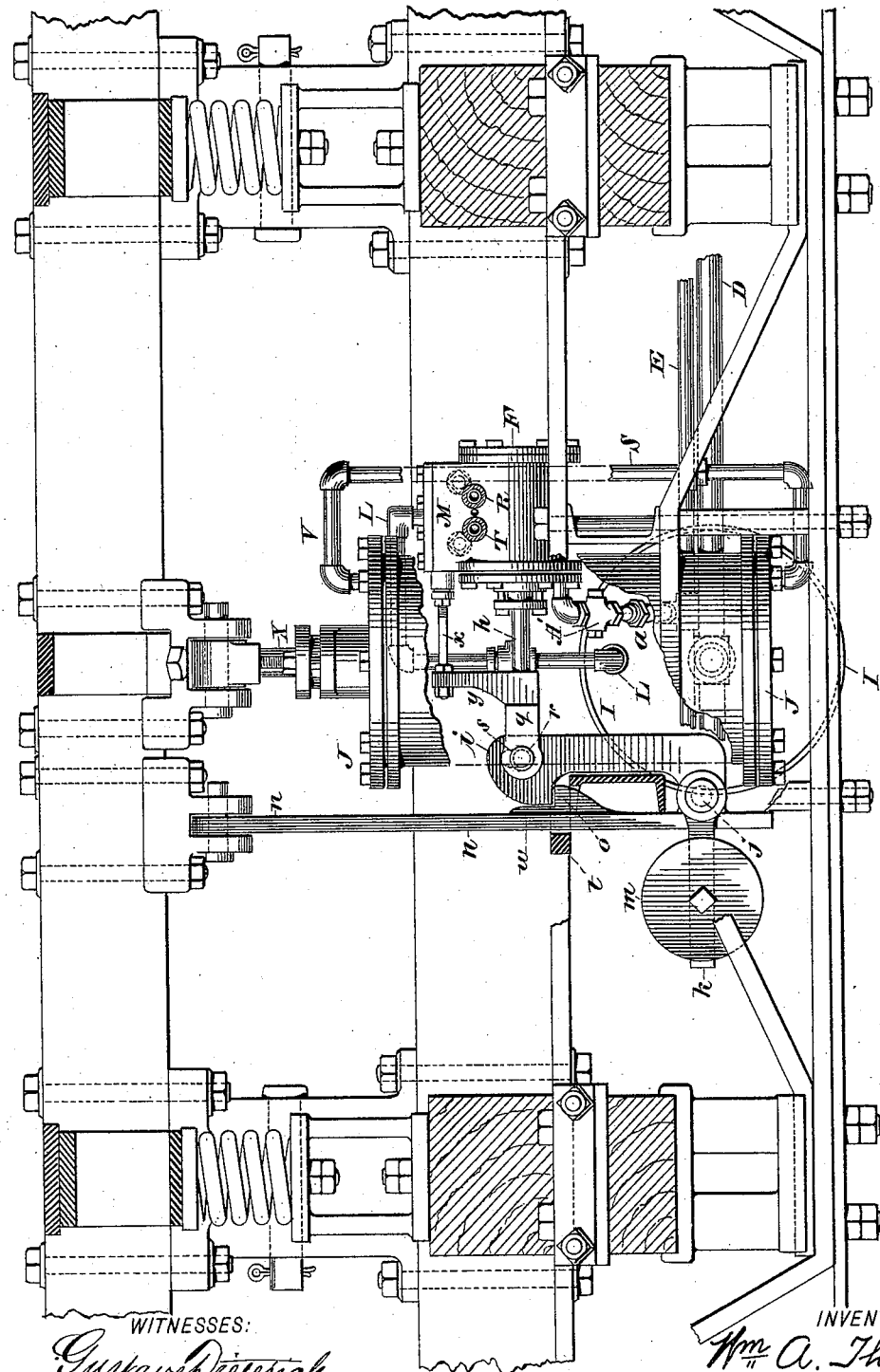

Referring to the accompanying drawings, Figure 1 is a side elevation, partly broken away, of a dumping-car provided with mechanism constructed in accordance with and embodying the invention. Fig. 2 is a vertical transverse section of same on the dotted line 2 2 of Fig. 1. Fig. 3 is a like view of same on an enlarged scale and partly broken away. Fig. 3$^a$ is a detached central vertical section of the pipes leading from the valve-chest connected with the latch-cylinder and the pipes branching therefrom to the upper and lower ends, respectively, of the dumping-cylinder. Fig. 4 is a vertical longitudinal section, partly broken away, of the car and showing in side elevation the compressed-air mechanism for tilting the car-body and locking it in its horizontal position, the dumping-cylinder being partly broken away to disclose the latch mechanism more clearly and the section being on the dotted line 4 4 of Fig. 5. Fig. 5 is an enlarged top view of a portion of the truck of the car and illustrating in a top view the compressed-air mechanism for tilting the car-body. Fig. 6 is an enlarged detached top view of the latch-cylinder and valve-chest connected therewith, the top of the valve-chest being removed for clearness of illustration. Fig. 7 is an enlarged detached central longitudinal section of the latch-cylinder and valve-chest with their connections, the position of the slide-valve in the valve-chest being the one assumed after the car-body has been tilted and it is desired to return the same to its horizontal position. Fig. 8 is a vertical transverse section of the latch-cylinder and valve-chest on the dotted line 8 8 of Fig. 7. Fig. 9 is a central vertical longitudinal section of the slide-valve in the valve-chest, showing the relation of the valve and ports when the tilting car-body is in its horizontal position, the said figure showing what is known as the "running" position of the valve, that is, the position the valve is given while the cars are in motion. Fig. 10 is a like view of same, showing the relation of the slide-valve to the ports while the car-body is being tilted to dump its contents. Fig. 11 is an enlarged top view of a portion of the truck and illustrating the combination of the compressed-air mechanism for dumping the car with the compressed-air mechanism for applying the brakes, both sets of mechanism being connected and supplied from one main train-pipe leading from the locomotive.

In the drawings, A designates the truck-frame, B the tilting car-body, and C the sustaining-pivot upon which the car-body may turn when tilted to discharge its contents. Each car of the train is provided with the main pipe-line D and an auxiliary pipe-line E, the former being to supply the compressed air from the locomotive for tilting the car-body and returning it to position, while the pipe-line E is of smaller diameter and utilized exclusively for directing the air from the locomotive to the latch-cylinder F. The main pipe-lines D E extend throughout the train, and at each car the train-pipe D is connected by a branch pipe G, containing an automatic check-valve H, with a compressed-air reservoir I, which carries the compressed air for operating the dumping-cylinder J. Each car of the train carries its own compressed-air reservoir I, and from the reservoir of each car a pipe L extends to the top of the valve-chest M, this pipe L being utilized to direct the air to the valve-chest, whence it is controlled as to its movement by the slide-valve N, contained in said chest and operating in connection with the ports lettered O P Q, respectively, in the manner hereinafter described. The port O is in communication with the pipe R, which connects with the pipe S, leading to the lower end of the dumping-cylinder J, and the port P communicates with the pipe T, which connects with the branch pipe V, leading to the upper end of said dumping-cylinder J, as more clearly indicated in Figs. 3 and 3ª. The port Q is an exhaust, and owing to the formation of the face of the valve N this exhaust may, as illustrated in Fig. 7, be thrown into communication with the port O for the purpose of exhausting the air from the pipes R S and lower end of the dumping-cylinder J at the time of the return of the tilting car-body to its horizontal position, or said exhaust-port Q may, as illustrated in Fig. 10, be brought into communication with the port P for the purpose of exhausting the air from the pipes T V and the upper end of the dumping-cylinder at the time it may be desired to tilt or dump the car-body B. The purpose of the slide-valve N and ports O P Q is to direct the compressed air to the upper end of the dumping-cylinder J for the purpose of effecting the movement of the car-body B and to exhaust or release any contained air from one end of the dumping-cylinder while admitting air to the opposite end thereof, thus releasing the pressure from one side of the piston in the dumping-cylinder while admitting air to the opposite side thereof. The dumping-cylinder J is mounted on trunnions W and contains the usual piston, whose rod X extends upward and is pivotally secured to the car-body, as illustrated in Fig. 3.

The cylinder J is adapted to oscillate on the trunnions W, and is substantially the same as the dumping-cylinder described and claimed in Letters Patent of the United States No. 496,672, granted May 2, 1893, to me for an improvement in dumping-cars. The pipes R T, leading, respectively, from the ports O P, will be in the form of flexible tubing in order to permit of the dumping-cylinder moving on its trunnions W to adapt itself to the line of travel of the piston-rod X.

The latch-cylinder F is connected at its front end by a pipe $a$ with the auxiliary train-pipe E for the supplying of compressed air from the locomotive, and said latch-cylinder F contains the piston $b$ and coiled spring $d$, which when compressed exerts its pressure against the piston $b$ to drive it toward the front end of the cylinder F. The rear head of the latch-cylinder F contains the internal central hub $e$, and the rear side of the piston $b$ is provided with a similar central hub $f$, and these hubs $e$ $f$ respectively receive the ends of the coiled spring $d$, as illustrated in Fig. 7, and afford a support for the said spring whether the latter is in its compressed or normal condition. The rear end of the latch-cylinder F contains an exhaust-aperture $g$. The piston $b$ carries the piston-rod $h$, which, as illustrated in Fig. 4, extends outward to and is pivotally connected with the latch-lever $i$, mounted upon the pivot $j$ and provided on its arm $k$ with the weight $m$, the effect of the latter being to throw the upper engaging end of the latch $i$ into contact with the bar $n$ or the shoulder $o$, connected therewith or formed thereon. The outer end of the piston-rod $h$ carries the bifurcated shoe $q$, which straddles the upper end of the latch-lever $i$, as shown in Fig. 5, and supports the opposite ends of the pin $r$, which passes through the elongated aperture $s$, formed in the latch-lever, as illustrated by dotted lines in Fig. 4. The bar $n$ is pivotally secured to the car-body, as illustrated in Figs. 2 and 4, and extends downward on an inclined plane through a loop $t$ in position to be engaged by the upper end of the latch-lever $i$ during the movement of the car-body, the said bar $n$, when the car-body is at rest in its horizontal position, being in the position indicated in Fig. 4, with its engaging shoulder $o$ beneath the shoulder formed on the latch-lever $i$. The projection or shoulder $o$, secured to or formed on the pivoted bar $n$, has the upward extension $w$, which prevents the edge of the lever $i$, when the car-body is in its horizontal position, from coming into direct contact with the bar $n$, while below the shoulder $o$ there is no such extension, and when the car-body is in its tilted position and the shoulder $o$ has passed upward free of the latch-lever $i$ the edge of the latter, under the influence of the spring $d$ in the latch-cylinder F and the weight $m$ on the arm $k$, will come into direct contact with the face of the bar $n$. The difference in the position of the latch-lever $i$, due to the presence of the extension $w$ above the shoulder $o$ and the non-existence of a similar extension below the shoulder $o$, affects the position of the slide-valve N, since, as illustrated in Fig. 4, the valve-rod $x$ is, by means of the arm $y$, connected with the piston-rod $h$, passing from the latch-cylinder piston $b$ to the latch-lever $i$.

When the car-body B is in its horizontal position and the edge of the latch-lever $i$ is in contact with the extension $w$, (which prevents it from coming into contact with the bar $n$,) the valve N will be in the position in which it is shown in Fig. 9, this being the running position, with all of the ports O P Q covered; and when the car-body B has been tilted to dump its contents, and the shoulder $o$, carried by the bar $n$, has passed upward and the edge of the latch-lever $i$ is against the lower portion of the bar $n$ below the shoulder $o$, the piston-rod $h$ and valve-rod $x$ will have moved an increased distance outward from the latch-cylinder F, this increased distance being equal to the thickness of the extension $w$ and resulting in the valve N assuming the position illustrated in Fig. 7, in which it will be observed that the port P is exposed to the air entering the upper portion of the valve-chest M through the pipe L, and hence that the said air may pass through the port P into the pipes T V and upper end of the dumping-cylinder J, where it will depress the piston in said cylinder and return the car-body to its horizontal position, while at the same time, as shown in Fig. 7, the port O and exhaust-port Q will be in communication with each other and the air from the pipes R S and lower end of the dumping-cylinder J will be released or exhausted. The condition of the bar $n$ and shoulder $o$ with relation to the latch-lever $i$ thus in a measure controls the position of the piston-rod $h$, valve-rod $x$, and valve N, the extension $w$ retaining the valve N over the ports O P Q in its running position and the absence of the extension $w$ when the car-body is tilted permitting an increased outward movement of the rod $h$, rod $x$, and valve N to uncover the port P, by which the air is permitted to reach the upper end of the dumping-cylinder J and return the car-body to position. While the car-body is in its horizontal position, it is securely locked by the engagement of the latch-lever $i$ with the shoulder $o$, and when it is desired to tilt the car-body B the air from the latch train-pipe E passes upward through the connecting-pipe $a$ and enters the end of the latch-cylinder F, driving the piston $b$ inward and drawing the rod $h$ and upper end of the latch-lever $i$ inward toward the latch-cylinder and free of the shoulder $o$, thus freeing the device by which the car-body is locked in its horizontal position, and at the same time the inward movement of the piston $b$ and piston-rod $h$ has the effect, through the connecting-arm $y$, of moving the valve-rod $x$ and valve N inward to the position shown in Fig. 10, connecting thereby the ports P Q and uncovering the port O for the admission of the air from the pipe L to the pipes R S, passing to the lower end of the dumping-cylinder J, wherein the air operates to elevate the piston and its rod X and tilt the car-body B.

As soon as the latch-lever $i$ has been drawn inward by the air entering the latch-cylinder F through the pipe $a$, and the bar $n$, carrying the shoulder $o$, has passed upward and the compressed air cut off from the latch train-pipe E, the spring $d$ and weight $m$ will, as above described, throw the latch-lever $i$ outward against the bar $n$, and the valve N will pass over the ports O Q and uncover the port P to admit air to the upper end of the dumping-cylinder J for the purpose of returning the car-body to its horizontal position. While the car-body is returning to its horizontal position, the bar $n$ passes downward through its supporting-loop $t$, and the lower inclined surface of the edge of the shoulder $o$, pressing against the upper curved front edge of the latch-lever $i$, will force the latter inward against the pressure of the spring $d$ and weight $m$ sufficiently for the shoulder $o$ to reach its normal position, (shown in Fig. 4,) the said weight and spring retaining their pressure on the lever $i$ and forcing it outward the moment the greater projecting point of the shoulder $o$ has passed the outer projecting point of the lever $i$. At the particular moment in the operation of the mechanism when the two extreme projecting points of the shoulder $o$ and latch-lever $i$ are passing each other the length of the rods $h$ $x$ and the position of the ports in the valve-chest M are such that the valve N will be driven inward momentarily a sufficient distance to slightly uncover the inlet-port O for the purpose of permitting the entrance of a limited quantity of the compressed air through the pipes R S to the lower end of the dumping-cylinder J, this limited supply of the air being introduced to the dumping-cylinder for the purpose of forming a cushion for the lower side of the piston just prior to its return to its normal position.

The pipe $a$, supplying the air from the latch train-pipe E to the latch-cylinder F, is provided with a valve A', which may be turned to cut off the air from the car at any time it may be desired to prevent any one or more cars of the train being tilted or dumped while the remaining cars of the train are being tilted or dumped. When the valve A' is turned to close the pipe $a$, the air in the pipe E will not enter the latch-cylinder F, but will continue its passage through the pipe E to the adjoining cars of the train without affecting the particular car having the closed valve A'.

The compressed air will be pumped into the main train-pipe D while the train of cars is in motion or at any time, since it is the purpose to fully charge the reservoirs I and retain them in their charged condition. The latch train-pipe E will be connected with the usual reservoir for compressed air now on the locomotive, and when it is desired to dump the cars the engineer will direct the air into said train-pipe E in order that the same may free the latch $i$ and set the valve N for the purpose of permitting the air from the reservoir I to affect the dumping of the car-bodies in the manner above described.

When it is desired to return the car-bodies to their horizontal position, the engineer will exhaust the air from the latch-line E, thus relieving the pressure of the air from the piston $b$ in the latch-cylinder and permitting the spring $d$ and weight $m$ to move the said piston outward to the front end of the latch-cylinders in position to effect the locking of the car-bodies in their horizontal position and the setting of the valve N in its running position. The reservoir I, located on each car, being fully charged with compressed air, the air from the said reservoir I will (when the air is admitted through the train-pipe E and connection $a$ to the latch-cylinder F for the purpose of unlocking the car-body and moving the valve N) pass through the pipe L and chest M and into any port which may be exposed at either end of the valve N, and hence the moment the air is admitted to the latch-cylinder F and the piston $b$ moves inward with the valve-rod $x$ and valve N to uncover the port O the compressed air from the reservoir I will immediately pass through the pipes R S to the lower end of the dumping-cylinder J and effect the tilting of the car-body. After the contents of the car have been dumped, the engineer exhausts the air from the pipe E and the piston $b$ and valve N move to their outward position, connecting the ports O Q and uncovering the port P, as shown in Fig. 7, at which time the air charging the reservoirs I will pass from the pipe L and chest M into the port P and thence through the pipes T V to the upper end of the dumping-cylinder J and return the car-body to its horizontal position, in which it will be locked by the latch-lever $i$ in the manner above described. I am thus, with the aid of one main train air-pipe D, enabled to supply the air for either end of the dumping-cylinder J instead of employing two main pipe-lines, one supplying the air to the upper end of the dumping-cylinder and the other to the lower end thereof.

In each of the branch pipes or connections G, leading from the main train-pipe D to the reservoirs I, will be provided the automatic check-valve H, above mentioned, of any suitable description, and the purpose of the check-valve is to prevent the air after once entering the reservoir I from escaping therefrom except through the outlet-pipe L, leading to the valve-chest M. The automatic check-valve H for each car is important in that it insures the retaining of the air in the reservoir I and permits the latter to remain charged even though an accident should happen to the train-pipe D. After the reservoirs I have been charged from the train-pipe D the air will remain in the reservoirs I even though it may become necessary to uncouple all of the cars of the train.

If, owing to accident or otherwise, the cars should become uncoupled, or if the train-pipe D should become broken or otherwise damaged and it should be desired to dump the cars or any one of them, this may be easily effected by simply raising the arm $k$ of the latch-lever $i$ for the purpose of pushing the piston-rod $h$ and valve-rod $x$ inward to set the valve N and uncover the port O, at which time the air from the reservoir I would pass from the pipe L and chest M through the port O to the lower end of the dumping-cylinder and tilt the car-body in the manner above described. Upon releasing the arm $k$ of the latch-lever $i$ the weight $m$ and spring $d$ would return the piston-rod $h$ and valve-rod $x$, with the valve N, to their extreme outward position, thereby uncovering the port P, as shown in Fig. 7, and permitting the air from the reservoir I to pass to the upper end of the dumping-cylinder J and return the car-body to its former horizontal position in the manner above set forth. It will thus be seen that important advantages are obtained by having each car carry its own reservoir I of compressed air to effect the dumping of the car-body instead of having train-pipes directly supply the dumping-cylinders J from the locomotive.

A further advantage derived from the employment of the reservoirs I for each car and the check-valve H in the branch leading from the main train-pipe D to the reservoir is that I am enabled to combine the compressed-air mechanism for dumping and returning the car-body with the usual freight triple valve for operating the brakes and to use in such combination but one main train-pipe D. In Fig. 11 I have illustrated the combination of the compressed-air dumping mechanism with the brake mechanism, both being supplied from one main train-pipe D. (Indicated in said figure by dotted lines.) The brake mechanism is shown by solid lines in Fig. 11, and its position on the car is indicated by dotted lines in Fig. 3, and in said Figs. 3 and 11, B' indicates the reservoir of the triple valve, C' the cylinder-body thereof, and D' the piston-rod connected with the leverage mechanism in a well-known manner. The triple valve illustrated in Fig. 11 is of the well-known Westinghouse construction and is in general use, and I do not in this application claim any part of the said valve. The brake-valve is supplied from the train-pipe D through the branch connecting-pipe E', the connection of the pipe E' with the pipe D being at a point beyond the check-valve H in order that when the air is exhausted in the train-pipe D for the purpose of applying the brakes the valve H will prevent the escape of the air from the reservoir I. It will thus be understood that the brakes may be applied by exhausting the air in the train-pipe D, but that this will not reduce the pressure in the reservoir I for the dumping-cylinder J, and hence should the brakes be applied there will remain in the reservoir I sufficient pressure for tilting the car-body and returning it to position.

The one train-pipe D serves to charge all of the reservoirs I of the train of cars and also for all of the triple valves of the train, while the independent auxiliary train-pipe E serves to operate all of the latches $i$ of the train of cars, and hence with the one main train-pipe D and one auxiliary train-pipe E the entire train of cars may be operated both as to the dumping mechanism and brake mechanism.

In arranging the brake mechanism upon the truck of the cars I prefer to locate the triple valve between the stringers F' G', where it can be supported by castings H', and to extend the piston-rod D' through the aperture I' in the casting J', which supports the sustaining-pivot C, on which the car-body B turns.

Without limiting my invention to any special form of dumping-car or in every instance to the details of construction above described, what I claim as new, and desire to secure by Letters Patent, is—

1. In a dumping-car, the dumping-cylinder and the reservoir for compressed air carried by the car, combined with the latch-cylinder having a piston and rod and an inlet for compressed air, the chest having outlet-ports communicating with opposite ends of the dumping-cylinder, the connection between the said reservoir and chest the controlling-valve in said chest and having its rod connected with the latch-cylinder rod, the weighted latch-lever connected with said latch-cylinder rod, and the bar carried by the car and being of a form to engage said latch-lever and retain the controlling-valve in the running position while the car-body is in its horizontal position and permit the extreme outward movement of said valve when the car-body is in tilted position; substantially as set forth.

2. In a dumping-car, the dumping-cylinder and the single main train-pipe for compressed air for both tilting the car-body and returning it to position, combined with the chest open to the pressure of the said air and having a valve-seat provided with ports communicating with pipes leading to the opposite ends of said dumping-cylinder the controlling-valve on the valve-seat in said chest, and an independent auxiliary train-pipe for compressed air to operate said controlling-valve; substantially as set forth.

3. In a dumping-car the dumping-cylinder and the single main train-pipe for compressed air for both tilting the car-body and returning it to position, combined with the chest into which said air passes from a single pipe, the valve-seat in said chest provided with ports communicating with pipes leading to opposite ends of said cylinder, the controlling-valve on said valve-seat, the latch-cylinder having its rod connected with the rod of said controlling-valve, and an independent auxiliary train-pipe for compressed air to operate the latch and controlling-valve; substantially as set forth.

Signed at Fort Pierre, in the county of Stanley and State of South Dakota, this 15th day of September, A. D. 1893.

WILLIAM A. THACHER.

Witnesses:
 JOHN HAYES,
 CHAS. H. FALES.